US007064764B2

(12) United States Patent
Takamura

(10) Patent No.: US 7,064,764 B2
(45) Date of Patent: Jun. 20, 2006

(54) LIQUID CRYSTAL DISPLAY CONTROL DEVICE

(75) Inventor: Satoshi Takamura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/373,079

(22) Filed: Feb. 26, 2003

(65) Prior Publication Data

US 2004/0027356 A1 Feb. 12, 2004

(30) Foreign Application Priority Data

Aug. 8, 2002 (JP) ............................ 2002-231513

(51) Int. Cl.
*G06F 13/18* (2006.01)
*G06G 5/36* (2006.01)

(52) U.S. Cl. ...................... 345/535; 345/558; 345/554

(58) Field of Classification Search ................ 345/501, 345/520, 531, 535, 537, 545, 554, 558, 87, 345/84, 98, 30

See application file for complete search history.

(56) References Cited

U.S. PATENT DOCUMENTS

| | | | | |
|---|---|---|---|---|
| 5,363,500 | A * | 11/1994 | Takeda | 345/535 |
| 5,615,376 | A * | 3/1997 | Ranganathan | 345/501 |
| 5,712,651 | A | 1/1998 | Tomiyasu | |
| 5,877,741 | A * | 3/1999 | Chee et al. | 345/629 |
| 5,959,640 | A | 9/1999 | Rudin et al. | |
| 6,003,098 | A * | 12/1999 | Krech, Jr. | 345/503 |
| 6,026,464 | A * | 2/2000 | Cohen | 711/5 |
| 6,205,524 | B1 * | 3/2001 | Ng | 711/151 |
| 6,414,689 | B1 * | 7/2002 | Wu | 345/558 |
| 6,674,447 | B1 * | 1/2004 | Chiang et al. | 345/704 |
| 2002/0075211 | A1 * | 6/2002 | Nakamura | 345/87 |
| 2002/0154130 | A1 * | 10/2002 | Niimura et al. | 345/542 |
| 2004/0012551 | A1 * | 1/2004 | Ishii | 345/87 |

FOREIGN PATENT DOCUMENTS

| | | |
|---|---|---|
| JP | 2001-005632 | 1/2001 |

* cited by examiner

*Primary Examiner*—Kee M. Tung
(74) *Attorney, Agent, or Firm*—Rabin & Berdo, P.C.

(57) ABSTRACT

A FIFO section having a FIFO memory is provided between a memory control section and a CPU_I/F section in a path through which image data outputted from a CPU is written into the video memory. Data necessary for writing the image data is stored into the FIFO section and, based on the data stored in the FIFO section, the image data is stored into the video memory under the control of the memory control section. With this configuration, the CPU can output the image data without a wait time until the FIFO memory becomes full, and thus there is provided a liquid crystal display control device that does not lower the operation efficiency of the CPU.

4 Claims, 8 Drawing Sheets

LIQUID CRYSTAL DISPLAY CONTROL DEVICE

BACKGROUND OF THE INVENTION

1. Field of the Invention

The present invention relates to a liquid crystal display control device that executes an access control for a video memory storing image data for liquid crystal displaying.

2. Description of the Related Art

In general, a conventional liquid crystal display control device has a configuration as shown in FIG. 1. In FIG. 1, a CPU_I/F section 12 is a block for interfacing with a CPU 10, a memory control section 14 is a block for executing an access control for a VRAM (Video RAM) 16, the VRAM 16 is a memory for developing image data, a palette section 18 is a block for converting image data into color data for outputting to an LCD 24, an FRC (Frame Rate Control) section 20 is a block for performing a control of a flicker pattern for expressing halftones of a STN-type LCD, an LCD_I/F section 22 is a block for converting into a data format matching with a type of the LCD 24, and a control section 26 is a block for controlling the entire operation timing.

As shown in FIG. 2, there are two paths for accessing the VRAM 16. Specifically, one is (a) a path for the CPU 10 to write image data, and the other is (b) a path for the memory control section 14 to read display data. Inasmuch as access from the CPU 10 in the path (a) is performed at discretionary timing, there is a possibility that access in the path (a) and access in the path (b) occur simultaneously. In such an event, since data for screen displaying needs to be read at constant timing, it is necessary to give priority to the access in the path (b). At this time, as shown in a time chart of FIG. 3, WAIT is inserted with respect to the access in the path (a) until the access in the path (b) is finished. This mediating operation is implemented by the memory control section 14. Specifically, even if a data write request signal CPU_WR from the CPU 10 to the VRAM 16 is outputted, when there is a display data read request from the memory control section 14 (i.e. address signal LCD_ADD and data signal LCD_DAT are valid), data VRAM_DAT of the VRAM 16 is outputted to the palette section 18, and thus, until such an output is completed, WAIT is applied to the access from the CPU 10.

As described above, in the foregoing conventional access control, there has been a problem that since access from the LCD_I/F section 22 is given priority, access from the CPU 10 to the VRAM 16 is kept waiting while the memory control section 14 performs a display data read operation, so that the operation efficiency of the CPU 10 is lowered.

SUMMARY OF THE INVENTION

In the present invention, a FIFO section having a FIFO memory is provided between a memory control section and a CPU_I/F section in a path through which image data outputted from a CPU is written into the video memory. Data necessary for writing the image data is stored into the FIFO section and, based on the data stored in the FIFO section, the image data is stored into the video memory under the control of the memory control section. With this configuration, the CPU can output the image data without a wait time until the FIFO memory becomes full, and thus there is provided a liquid crystal display control device that does not lower the operation efficiency of the CPU.

DETAILED DESCRIPTION OF THE PREFERRED EMBODIMENTS

Now, the preferred embodiments of the present invention will be described in detail with reference to the accompanying drawings.

First Embodiment

Figure 1:
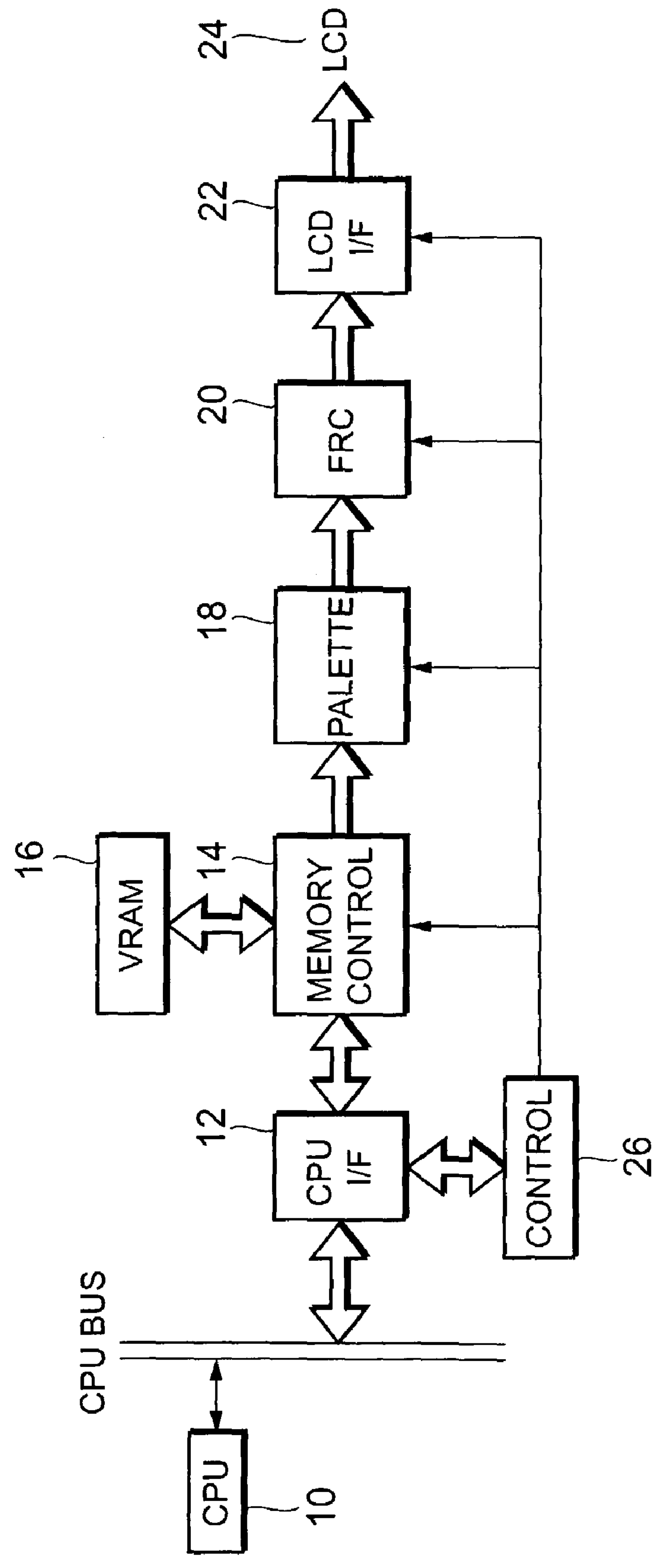
Fig.1 PRIOR ART
FIG. 1 is a block diagram showing a configuration of a conventional liquid crystal display control device.
Figure 2:
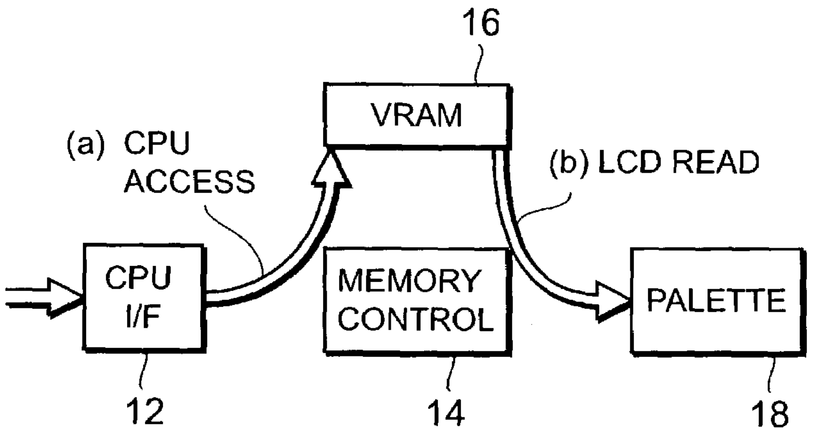
Fig.2 PRIOR ART
FIG. 2 is an explanatory diagram for explaining conventional concurrent accesses to a VRAM.
Figure 3:
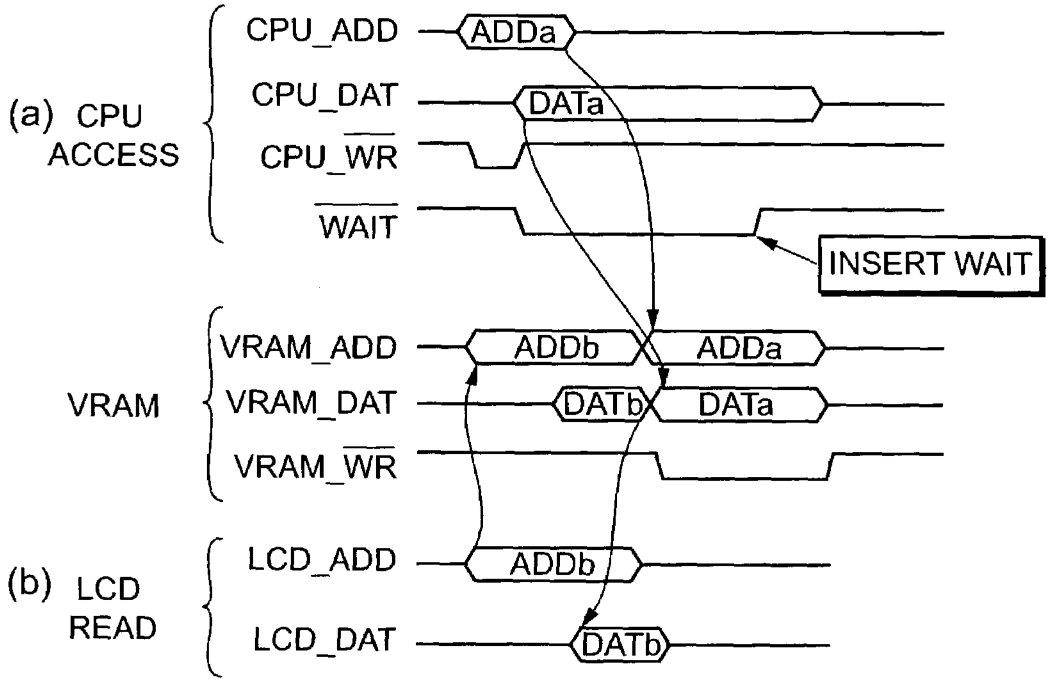
Fig.3 PRIOR ART
FIG. 3 is a time chart showing mediation upon occurrence of the conventional concurrent accesses to the VRAM.
Figure 4:
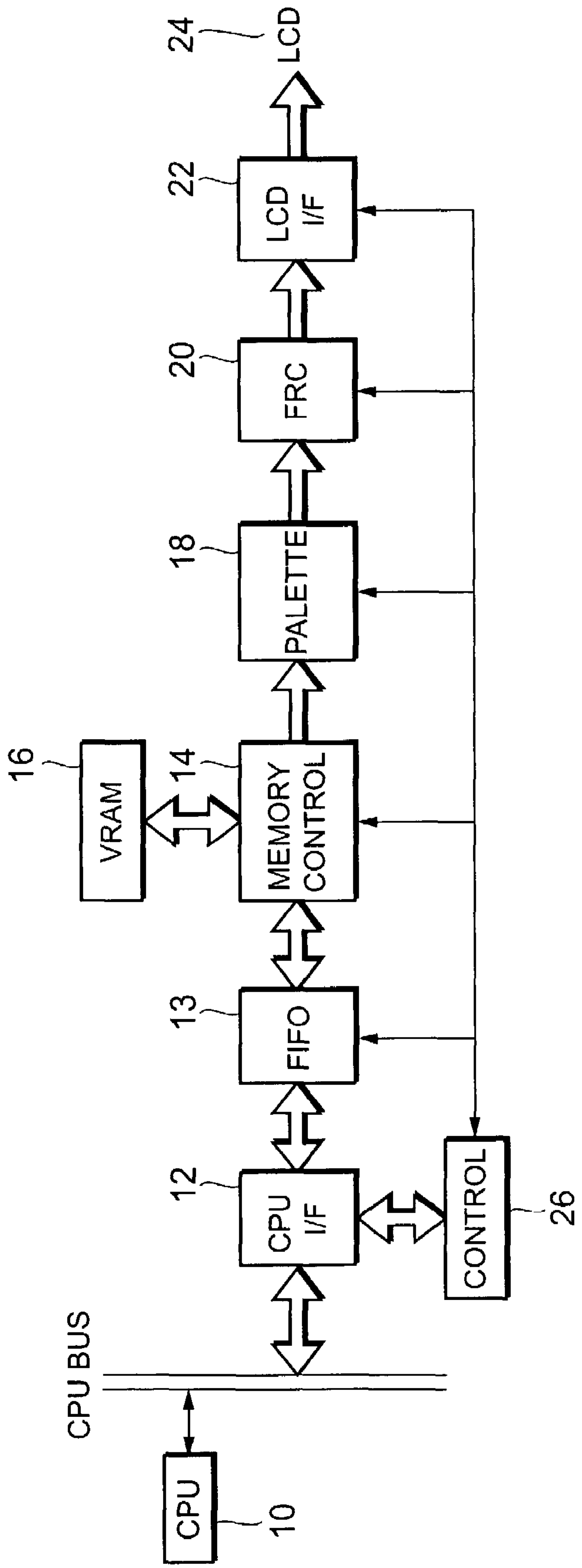
FIG. 4 is a block diagram showing a configuration of a liquid crystal display control device in a first preferred embodiment of the present invention.

FIG. 4 is a block diagram showing a configuration of a liquid crystal display control device in the first embodiment, wherein the same constituent elements as those in the conventional liquid crystal display control device of FIG. 1 are given the same reference numerals. In FIG. 4, a CPU_I/F section 12 is a block for interfacing with a CPU 10, a memory control section 14 is a block for executing an access control for a VRAM 16, the VRAM 16 is a memory for developing image data, a palette section 18 is a block for converting image data into color data for outputting to an LCD 24, an FRC section 20 is a block for performing a control of a flicker pattern for expressing halftones of a STN-type LCD, an LCD_I/F section 22 is a block for converting into a data output format matching with a type of the LCD 24, and a control section 26 is a block for executing a control of the entire operation timing. A FIFO section 13 comprises a FIFO (First In First Out) memory for temporarily storing data to be written by the CPU 10 into the VRAM 16, and a control section therefor.

The memory control section 14 regularly reads display data from the VRAM 16, then after data conversion is implemented in the palette section 18 and the FRC section 20, the LCD_I/F section 22 outputs a synchronizing clock signal and the display data to the LCD 24.

On the other hand, it is necessary that the CPU 10 updates data of the VRAM 16 every time an image to be displayed changes.

In this manner, in the accesses to the VRAM 16, there exist access from the CPU 10 for updating data (hereinafter referred to as “CPU access”), and access from the LCD_I/F section 22 for reading data to be displayed on the LCD 24 (hereinafter referred to as “LCD read”).

For preventing a pause of data displayed on the LCD 24, the LCD read needs to be performed at prescribed timings and thus needs to be given priority over the CPU access.

Therefore, in this embodiment, the FIFO section 13 is provided between the CPU_I/F section 12 and the memory control section 14. With this configuration, it is possible to write data into the FIFO section 13 without directly writing the data into the VRAM 16, upon CPU access. Accordingly, irrespective of the presence or absence of the LCD read, the CPU 10 can output image data without WAIT. The data written into the FIFO section 13 is written into the VRAM 16 while no LCD read is implemented, under the control of the memory control section 14. An operation in this event will be described in detail referring to FIGS. 5 to 7.

Figure 5:
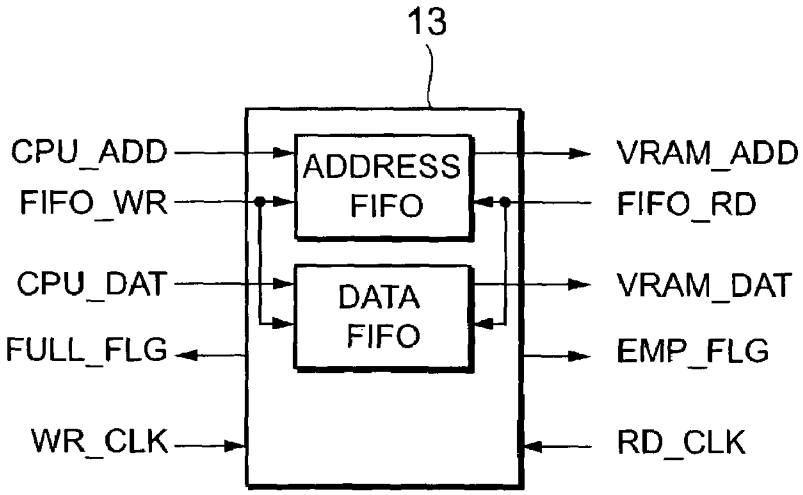
FIG. 5 is a block diagram showing a configuration of a FIFO section in the first preferred embodiment.

FIG. 5 is a diagram showing a configuration of the FIFO section 13, wherein two FIFO memories for address and data are disposed for storing address data required by the CPU 10 to access the VRAM 16 and write data, respectively. In FIG. 5, CPU_ADD and CPU_DAT represent an address and data written into the two FIFO memories, respectively, and VRAM_ADD and VRAM_DAT represent an address and data read from the two FIFO memories, respectively. In addition thereto, there are provided FIFO_WR (active low) representing a write enable signal, FIFO_RD (active low) representing a read enable signal, a flag signal EMP_FLG (active low) representing an empty state of the FIFO memories, a flag signal FULL_FLG (active low) representing a full state of the FIFO memories wherein all cells of the FIFO memories are written, WR_CLK representing a write clock signal, and RD_CLK representing a read clock signal.

Figure 6:
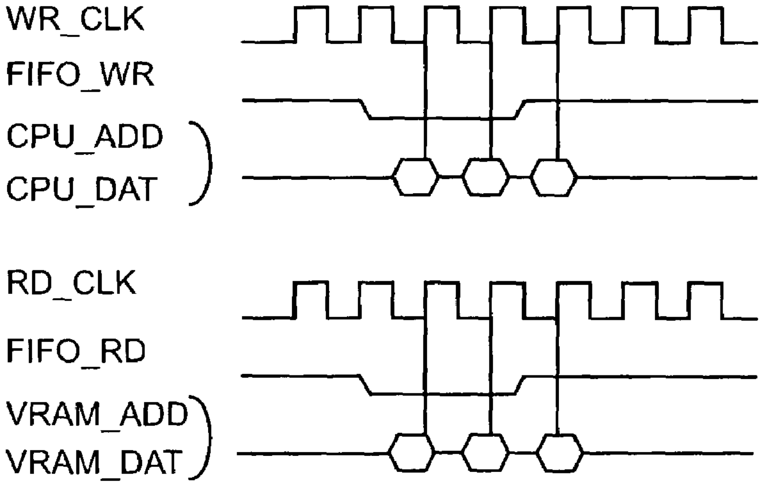
FIG. 6 is a write/read time chart of the FIFO section in the first preferred embodiment.

As shown in FIG. 6, each FIFO memory implements write/read on the leading edge of the clock pulse when FIFO_WR/FIFO_RD is valid. The WR_CLK signal and the RD_CLK signal may also be asynchronous to each other.

Figure 7:
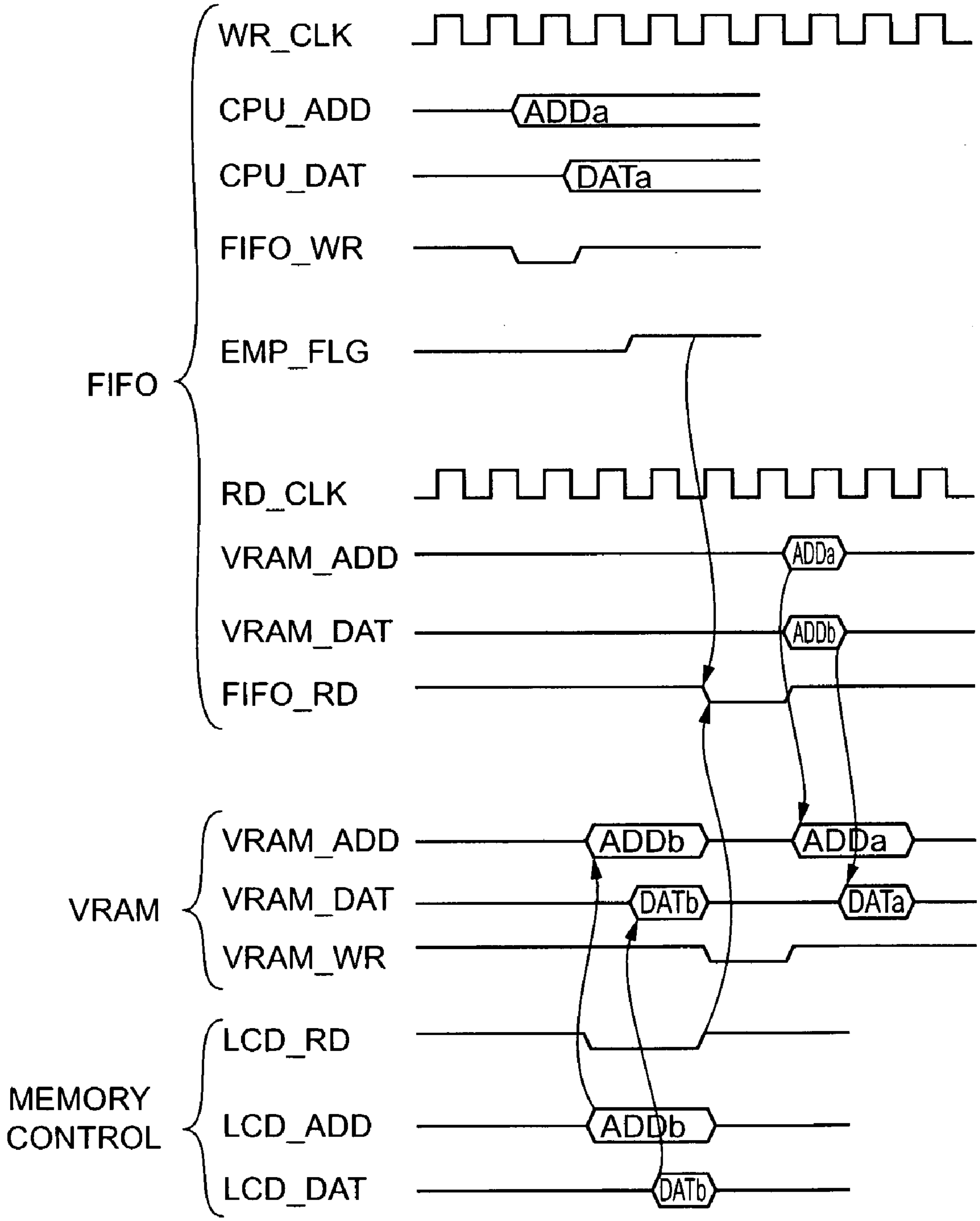
FIG. 7 is a write/read time chart of a VRAM in the first preferred embodiment.

FIG. 7 is a time chart of writing/reading with respect to the VRAM 16 via the FIFO section 13 in the first embodiment. CPU ADD, CPU_DAT and FIFO_WR (active low) are signals outputted from the CPU 10 for writing into the FIFO memories, respectively. In this event, there may be such an instance where specifications of bus timing of the CPU 10 and bus timing of the FIFO section 13 differ from each other. In this case, the CPU_I/F section 12 carries out conversion such that the bus specification upon data writing matches with the specification of the FIFO section 13.

When address data is written into the address FIFO memory based on CPU_ADD and write data is written into the data FIFO memory based on CPU_DAT, EMP_FLG becomes inactive. Based on EMP_FLG having become inactive, the memory control section 14 detects the presence of write data from the CPU 10 to the VRAM 16.

The memory control section 14 mediates VRAM accesses, i.e. LCD read and CPU access. In FIG. 7, EMP_FLG represents the presence of write data to the VRAM 16 in the FIFO memory, while LCD_RD is active to represent the presence of LCD read. In this event, the memory control section 14 gives priority to the LCD read and thus first implements the LCD read (data read from VRAM into LCD). When the LCD read is finished, LCD_RD becomes inactive so that the memory control section 14 reads the data from the FIFO memories and performs writing into the VRAM 16. At this time, the memory control section 14 implements conversion of the data read from the FIFO memories so as to match with the bus timing specification of the VRAM 16.

Through the foregoing operation, the writing into the VRAM 16 via the FIFO section 13 and the reading of LCD drawing data from the VRAM 16 can be implemented. In this event, if the writing of data into the FIFO memories is faster than the reading of data from the FIFO memories so that the FIFO memories become full, FULL_FLG becomes active. Accordingly, it may be configured to keep the CPU 10 waiting to write into the FIFO memories while FULL_FLG is active, or to notify the CPU 10 by interrupt processing or the like that the FIFO memories are full, thereby to prohibit writing into the FIFO memories while FULL_FLG is active.

As described above, according to the first embodiment, the FIFO section 13 is provided between the CPU 10 and the VRAM 16 to allow data to be written into the VRAM 16 via the FIFO section 13. Therefore, until the FIFO memories become full, data writing can be implemented without WAIT, so that writing of image data can be accomplished without lowering the processing efficiency of the system.

Second Embodiment

Figure 8:
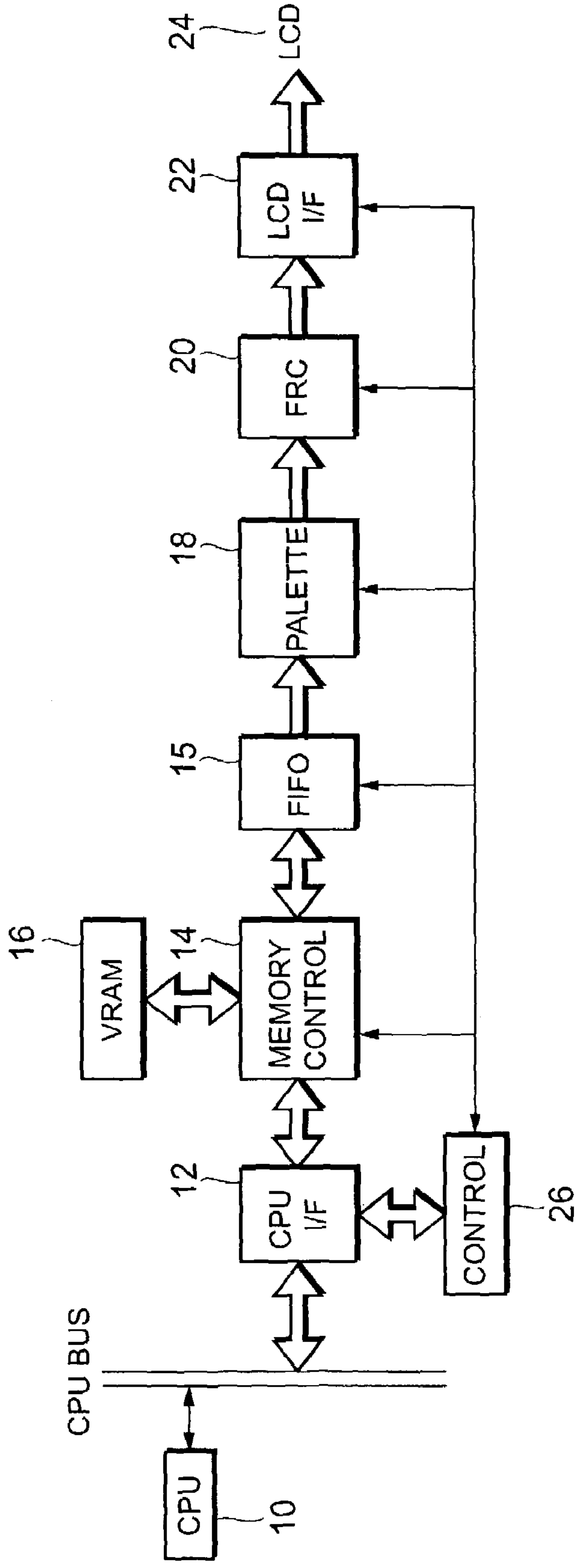
FIG. 8 is a block diagram showing a configuration of a liquid crystal display control device in a second preferred embodiment of the present invention.

FIG. 8 is a block diagram showing a configuration of a liquid crystal display control device in the second embodiment. Functions of respective processing blocks other than a FIFO section 15 are the same as those of the corresponding blocks in the first embodiment. On the other hand, the FIFO section 15 differs in configuration from the FIFO section 13, details of which are shown in FIG. 9.

Figure 9:
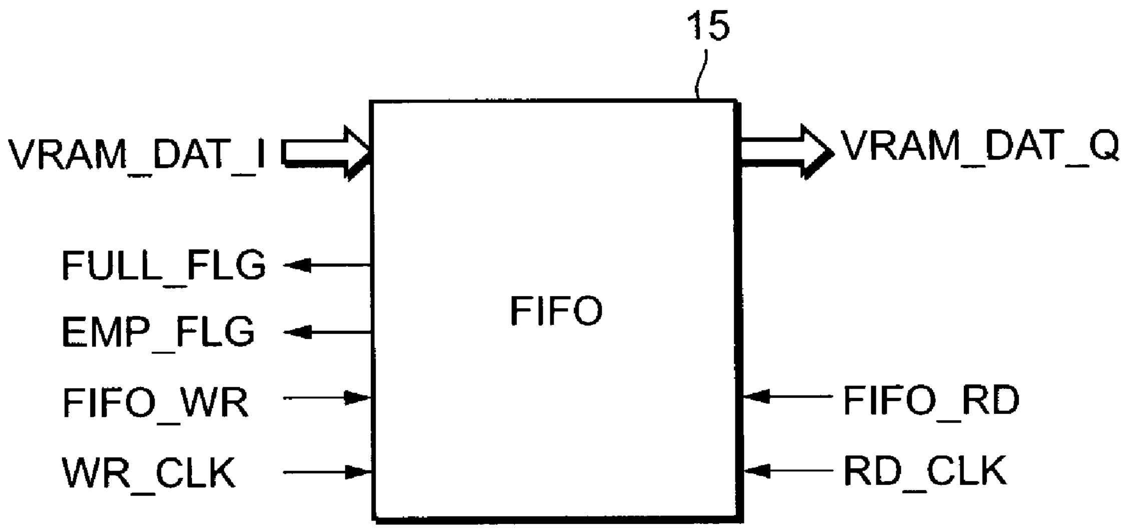
FIG. 9 is a block diagram showing a configuration of a FIFO section in the second preferred embodiment.

As shown in FIG. 9, the FIFO section 15 in the second embodiment is provided with only a data FIFO memory for temporarily storing data read from the VRAM 16, as opposed to the FIFO section 13 in the first embodiment where the address FIFO memory and the data FIFO memory are separately provided. In FIG. 9, VRAM_DAT_I represents data read from the VRAM 16, while VRAM_DAT_O represents data outputted to the palette section 18. The other signals have the same functions as those in the first embodiment.

In the second embodiment, the memory control section 14 reads sequentially from the VRAM 16 image data to be displayed, and stores them in the FIFO memory of the FIFO section 15. On the other hand, the palette section 18 reads the image data from the FIFO section 15 at data requiring timings based on a control signal from the control section 26. The image data are stored in the FIFO section 15 in displaying order. Thus, by reading the data sequentially from the FIFO section 15 according to the timings from the control section 26, target display images can be obtained.

Since there are access from the CPU 10 for writing/reading with respect to the VRAM 16 and access for writing from the VRAM 16 into the FIFO section 15, the memory control section 14 needs to mediate them.

Figure 10:
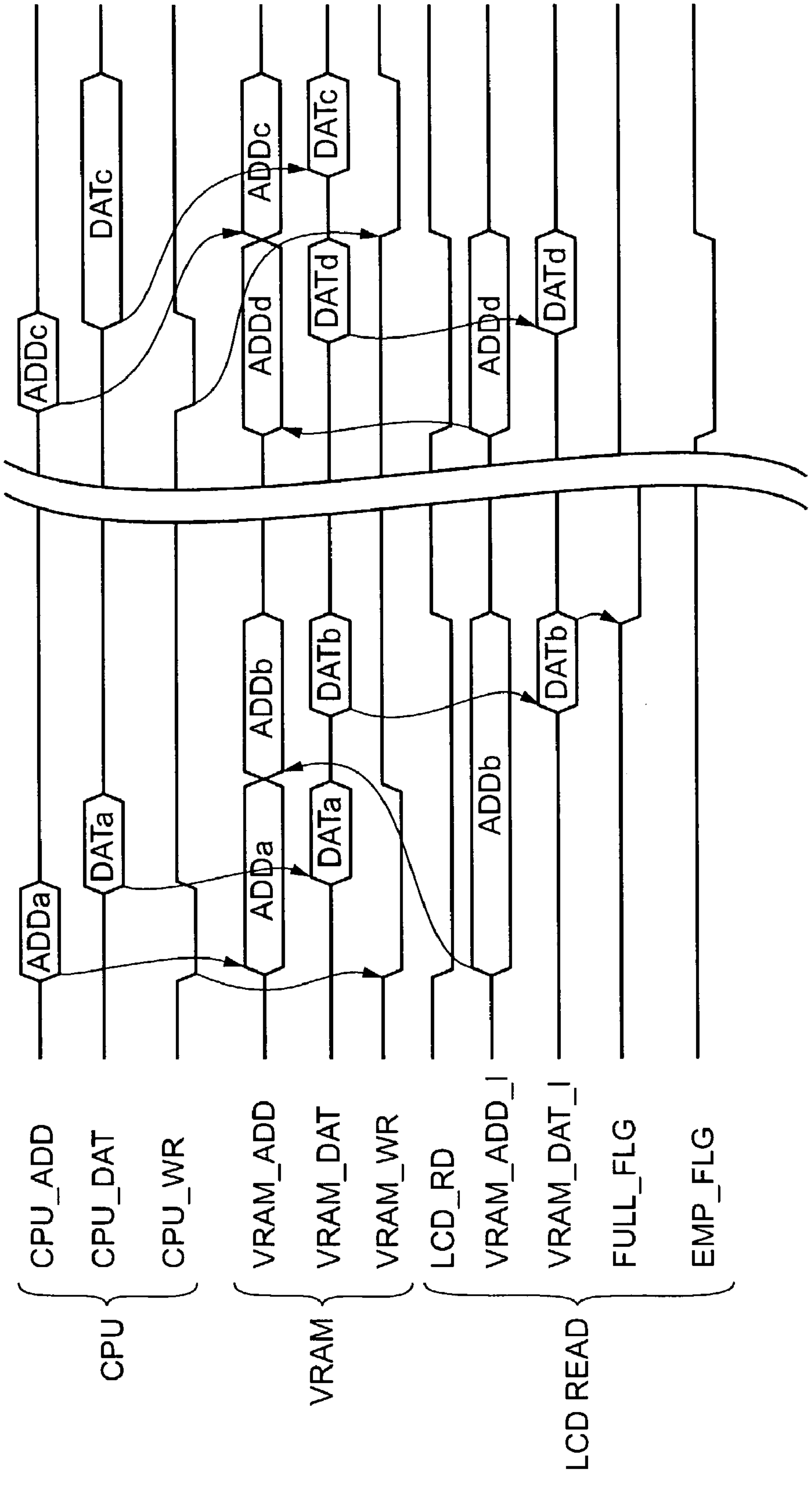
FIG. 10 is a write/read time chart of a VRAM in the second preferred embodiment.

FIG. 10 is a write/read time chart of the VRAM 16 in the second embodiment, wherein the state of such mediation is shown. Signals CPU_ADD, CPU_DAT and CPU_WR are an address bus signal, a data bus signal and a write signal of the CPU 10, respectively. VRAM_ADD, VRAM_DAT and VRAM_WR are an address bus signal, a data bus signal and a write signal of the VRAM 16, respectively. On the other hand, LCD_RD is a signal indicative of LCD read, while VRAM_ADD_I and VRAM_DAT_I represent an address and data of the VRAM 16 that are read into the FIFO section 15.

When there is no access from the CPU 10, the memory control section 14 reads data from the VRAM 16 and stores it into the FIFO section 15 until FULL_FLG becomes active. When the palette section 18 reads out the data and FULL_FLG becomes inactive, the memory control section 14 writes data into the FIFO section 15 until FULL_FLG becomes active again. In this event, the order of reading the data from the VRAM 16 is a displaying order, wherein the memory control section 14 performs reading of the data while updating a read address of the VRAM 16 one after another.

When there is an access request to the VRAM 16 from the CPU 10, the access from the CPU 10 is given priority over the processing of reading into the FIFO section 15. As data required by the palette section 18 during this term, data stored in the FIFO section 15 is used. When the FIFO memory of the FIFO section 15 becomes empty and thus EMP_FLG becomes active, the priority order is changed to give priority to data reading from the VRAM 16 to the FIFO section 18. During this term, an access request from the CPU 10 is kept waiting.

In the example shown in FIG. 10, the CPU 10 implements writing relative to the VRAM 16. On the other hand, also in case of reading the VRAM data, the control is executed at the same timings.

Through the foregoing operation, inasmuch as the FIFO memory of the FIFO section 15 does not become empty, the CPU 10 can access the VRAM 16 without WAIT and thus image data can be updated without lowering the system efficiency.

As described above, in the second embodiment, the FIFO section 15 is provided between the memory control section 14 and the palette section 18 to allow display data to be read into the palette section 18 from the VRAM 16 via the FIFO section 15, so that the CPU 10 can access the VRAM 16 preferentially inasmuch as the FIFO memory does not become empty. Therefore, the CPU 10 can access the VRAM 16 without WAIT, and thus writing/reading of image data can be accomplished without lowering the system efficiency.

In the first or second embodiment, the same effect can be achieved even using a dual port memory instead of the FIFO memory.

What is claimed is:

1. A liquid crystal display control device comprising:

a CPU_I/F section controlled by a control signal, which interfaces with a CPU;

a video memory which stores data from the CPU passing through the CPU_IF section;

a memory control section controlled by the control signal, which performs access control for said video memory, such as to enable either the data from the CPU passing through the CPU_IF section to be written to the video memory or data stored in the video memory to be read out, wherein the memory cintrol section is connected directly between the CPU_IF section and the video memory;

a FIFO section controlled by the control signal, which connects to said memory control section, and which stores the data read out from the video memory;

a palette section controlled by the control signal, which connects to the FIFO section, and which reads out the data stored in the FIFO section and converts the same into color data for displaying on a liquid crystal display; and a controller generating the control signal, which allows said video memory to store the data from the CPU passing through the CPU_IF section, regardless of whether the data stored in said FIFO section is being read out by the palette section, when said FIFO section is not empty, and which inhibits storing of the data from the CPU in said video memory when said FIFO section is empty.

2. A liquid crystal display control device according to claim 1, wherein the data from the CPU includes image data and address data for storing the image data in said video memory, and said FIFO section comprises a single FIFO memory for sequentially storing the image data outputted from said video memory, under the control of said memory control section.

3. A liquid crystal display control device according to claim 2, wherein said FIFO section uses a dual port memory instead of said FIFO memory.

4. A liquid crystal display control device according to claim 1, wherein said FIFO section comprises a dual port memory.

* * * * *